3,178,429
METHOD OF PRODUCING CHLOROCYANURIC ACIDS

Steve Vazopolos, St. Louis, Mo., assignor to Monsanto Company, a corporation of Delaware
No Drawing. Filed Feb. 23, 1961, Ser. No. 90,912
11 Claims. (Cl. 260—248)

The present invention relates to chlorocyanuric acids (including chloroisocyanuric acids) particularly trichlorocyanuric acid and dichlorocyanuric acid, and to novel processes for producing same. The present invention further relates to improved continuous processes for preparing trichlorocyanuric acid and dichlorocyanuric acid.

It has been proposed heretofore in U.S. Patent 2,607,738 and U.S. Reissue Patent 24,412, issued to Edgar E. Hardy on August 19, 1952, and on December 31, 1957, respectively, to prepare trichlorocyanuric acid by dissolving cyanuric acid in the theoretical quantity of a 5% solution of caustic soda or potash and treating the resulting solution with chlorine until three atoms of alkali have been substituted by chlorine. However, Chattaway and Wardmore, in the Journal of the Chemical Society, volume 81, pages 200-202, point out that, where relatively large quantities of reactants are used in the chlorination of cyanuric acid dissolved in the theoretical quantity of potash, low product yields and products low in available or active chlorine are obtained. Thus, the foregoing batch process is not adaptable to large scale commercial production.

It has also been proposed heretofore in U.S. Patent 2,964,525, issued December 13, 1960, to William L. Robinson to prepare trichlorocyanuric acid by continuously chlorinating an aqueous solution of trisodium cyanurate at a pH of not more than 4.5 and at temperatures below 50° C. and to prepare dichlorocyanuric acid by continuously chlorinating an aqueous solution of dipotassium cyanurate at a pH of not more than 4.5. Although trichlorocyanuric acid and dichlorocyanuric acid can be obtained in pure form and in high yields from the processes of the Robinson patent, these processes are relatively expensive due to the relatively high cost on a commercial scale, of sodium and potassium hydroxides which are employed to prepare the trisodium cyanurate and dipotassium cyanurate, respectively.

Also, in processes involving the chlorination with chlorine of aqueous solutions of alkali metal salts of cyanuric acid, such as sodium or potassium cyanurate to produce chlorocyanuric acids there is always the potential dangers of the formation of significant quantities of nitrogen trichloride, if the process is not carefully controlled and the pH is permitted to rise above 4.5.

Nitrogen trichloride is a noxious material which is known to be a hazardous explosive and is also poisonous. Its formation, in significant quantities in a commercial production facility, constitutes a hazard to personnel as well as property. Some nitrogen trichloride is always formed due to the decomposition of the triazine ring of the cyanuric acid radical of alkali metal salts of cyanuric acid, when aqueous solution of such salts are reacted with chlorine at a pH above 4.5. However, highly hazardous quantities of nitrogen trichloride are formed when the pH of alkali metal cyanurate solutions are contacted with chlorine, in any form, at a pH above 8.0. At a pH in the range of from 4.5 to 7.0 the formation of nitrogen trichloride can be reduced to some extent by lowering the temperature at which the chlorine is contacted with the alkali metal cyanurate to below 35° C. However, when the reaction pH is above about 8.0 substantial decomposition of the triazine ring occurs, resulting in the formation of hazardous amounts of nitrogen trichloride even at temperautres of 0° C. Also such nitrogen trichloride formation increases further with an increase in pH, and alkali metal cyanurates cannot safely be chlorinated above pH 9. Furthermore, the destruction of the cyanurate through decomposition of the triazine ring, results in materially lower yields of chlorocyanuric acids.

It is one object of the present invention to provide an economically and commercially practicable method for producing chlorocyanuric acids, particularly trichlorocyanuric acid or dichlorocyanuric acid in good yields.

It is another object of the present invention to provide a process for preparing chlorocyanuric acids which process substantially reduces or eliminates the disadvantages or potential disadvantages of the prior art methods discussed above.

Other objects and advantages of the present invention will become apparent from the following description and the appended claims.

It has presently been found that chlorocyanuric acids, particularly trichlorocyanuric acid and dichlorocyanuric acid, may be economically prepared by introducing and reacting gaseous or liquid chlorine, preferably gaseous chlorine, in an aqueous alkaline dispersion or slurry of an alkaline-earth metal salt of cyanuric acid, preferably trialkaline-earth metal salts and di-alkaline-earth metal salts of cyanuric acid, which alkaline dispersion has a pH of from 12.0 to 12.6, at a temperature in the range of from just above the freezing point of said slurry to about 50° C. and until the pH of the dispersion is below about 4.0. By so proceding an aqueous reaction mixture, having the aforedefined pH, is formed which comprises a slurry of chlorocyanuric acid in an aqueous solution of an alkaline-earth metal chloride, such slurry being essentially free of nitrogen chlorides. The chlorocyanuric acid can then be readily separated from the bulk of the aqueous phase of the slurry by methods well-known to those skilled in the art such as centrifugation, decantation, sedimentation, filtration or the like.

Surprisingly, the introduction of chlorine into aqueous, alkaline, dispersions of alkaline-earth metal cyanurates, which dispersions have a pH above 12.0 and often as high as 12.6, results in the production of chlorocyanuric acids without the formation of significant quantities of nitrogen trichloride which is unexpected in view of formation of appreciable quantities of nitrogen trichloride in the reaction between chlorine and solutions of alkali metal cyanurates under the same pH conditions.

The alkaline-earth metal cyanurates which are employed in the process of the present invention are relatively insoluble in water at ordinary temperatures, that is, 20° C.–25° C., being water soluble only to an extent of 0.1% to 0.2% by weight at such temperatures. The water solubility of these alkaline-earth metal cyanurates is unexpectedly less than 0.1 to 0.2% at higher temperatures. Thus, at temperatures of 50° C., less than 0.1% by weight of such cyanurates will dissolve in water and this solubility property is contrary to the solubility of alkali-metal cyanurates which have significantly increased solubilities at elevated temperatures.

Although relatively insoluble in water, the aqueous alkaline dispersions of alkaline-earth metal cyanurates, which are employed in the preparation of the chlorocyanuric acids in accordance with the processes of the present invention, almost always have a pH above 12.0 and often have a pH above 12.5. The pH of such aqueous dispersions is also not substantially affected by the concentration of the alkaline-earth metal cyanurate dispersed therein. Thus, for example, an aqueous dispersion containing 1% by weight of tricalcium dicyanurate will generally have a pH of 12.5 and an aqueous dispersion containing 30% by weight of tri-calcium dicyanurate will have a pH of 12.6. On the other hand, an aqueous dispersion containing 1% up to 30% by weight of mono-calcium mono-cyanurate will usually have a pH of 12.0–12.1.

The concentration of alkaline-earth metal cyanurate in the aqueous alkaline dispersions, which can be chlorinated with chlorine in accordance with the process of the present invention, may vary to a considerable extent, say from 10% to 30% by weight of alkaline-earth metal cyanurate, but is preferably in the range of from 15% to 30%. It is particularly preferred to use an aqueous dispersion containing from between 20% and 25% by weight of alkaline-earth metal cyanurate in the form of a dispersed solid and between 75% and 80% of water. At higher concentrations of alkaline-earth metal cyanurates, e.g., 20% to 30% by weight, such dispersions have thixotropic properties, that is they will form gel-like solids upon standing. These gel-like solids can be transformed into the original liquid state by agitation, preferably by mechanical means.

The alkaline-earth metal cyanurates may be prepared by a number of methods such as, for example, reacting an alkaline-earth metal carbonate with cyanuric acid, but are most desirably prepared by bringing together and reacting an alkaline earth metal oxide or hydroxide, in the form of an aqueous slurry, with an aqueous slurry of cyanuric acid, in the molecular proportions necessary to obtain the desired alkaline-earth metal salt of cyanuric acid. Thus, for example, where it is desired to prepare a tri-alkaline-earth metal di-cyanurate, an aqueous slurry containing three molecular proportions of an alkaline-earth metal hydroxide is mixed and reacted with an aqueous slurry containing two molecular proportions of cyanuric acid. By so proceeding an aqueous alkaline dispersion of the trialkaline-earth metal di-cyanurate, in the form of a dispersed solid, usually having a pH of between 12.5 and 12.6 is formed, and chlorine can then be introduced into such slurry to prepare trichlorocyanuric acid. On the other hand, when it is desired to prepare a mono-alkaline-earth metal mono-cyanurate, an aqueous slurry containing one molecular proportion of an alkaline-earth metal oxide or hydroxide is usually mixed and reacted with an aqueous solution or slurry containing one molecular proportion of cyanuric acid. By so proceeding, an aqueous alkaline dispersion of mono-alkaline-earth metal mono-cyanurate in the form of a dispersed solid is formed which usually has a pH from 12.0–12.1, which can then be directly chlorinated with chlorine as herein described to produce dichloro-cyanuric acid.

The concentration of alkaline-earth metal oxide or hydroxide in the slurry which is added to the cyanuric acid slurry may vary to some extent but an aqueous slurry containing from 10% to 35% by weight preferably 25% to 35% by weight of alkaline-earth metal hydroxide has been found particularly useful. The concentration of cyanuric acid in the aqueous solution or slurry of cyanuric acid to which the alkaline-earth metal hydroxide slurry is added may also vary to some extent but a slurry containing from 5% to 25%, preferably 15% to 25% by weight of cyanuric acid has been found especially desirable.

Although any of the group of alkaline-earth metal salts of cyanuric acid or mixtures thereof may be used to prepare chlorocyanuric acids in accordance with the processes of the present invention the calcium, magnesium, and barium salts of cyanuric acid are preferred and calcium salts are particularly preferred.

Trichlorocyanuric acid may be prepared, in accordance with one embodiment of this invention by introducing chlorine into an aqueous alkaline dispersion or slurry containing 10% to 30% by weight, preferably 20% to 30% by weight, of a tri-alkaline-earth metal di-cyanurate in the form of a dispersed solid, having the general empirical formula $(C_3N_3O_3)_2 \cdot M_3$ where M is an alkaline-earth metal, preferably calcium, magnesium, or barium, although it is understood that the corresponding salts of beryllium and strontium may also be used. The chlorine is introduced into the aqueous dispersion of the alkaline earth cyanurate, which usually has a pH of from 12.0 to 12.5 and which may be maintained at a temperature in the range of from just above the freezing point of the dispersion to about 50° C., preferably from 0° C.–50° C., more preferably 10° C. to 35° C., until the pH of the aqueous dispersion drops from the afore-mentioned alkaline pH to a pH below 4.0 preferably below 3.5. By so proceeding, an aqueous reaction mixture having a pH below 4.0 and comprising an aqueous slurry of trichlorocyanuric acid and an aqueous solution of alkaline-earth metal chloride is formed and from which trichlorocyanuric acid may readily be separated as heretofore described.

In accordance with another embodiment of this invention, dichlorocyanuric acid may be prepared by introducing chlorine and an aqueous dispersion containing from 10% to 30% by weight, preferably 20% to 30% by weight, of a mono-alkaline-earth metal mono-cyanurate in the form of a dispersed solid having the empirical formula $C_3N_3O_3H \cdot M$, wherein M is an alkaline earth metal, preferably calcium, magnesium, or barium, although it is understood that the corresponding salts of beryllium and strontium may also be used. The chlorine is introduced into the aqueous alkaline dispersion of such cyanurate, which usually has a pH of 12.0–12.1 and which may be maintained at a temperature in the range of from just above the freezing point of the dispersion to about 50° C., preferably from 0° C. to 50° C., more preferably from 10° C. to 35° C., until the pH of the dispersion is below 4.0, preferably below 3.5 and more preferably below 2.5. By so proceeding, an aqueous reaction mixture having a pH below 4.0 and comprising an aqueous slurry of dichlorocyanuric acid and an aqueous solution of alkaline-earth metal chloride is formed and from which dichlorocyanuric acid may be readily separated as hereinbefore described.

The chlorine may be introduced into any of the above mentioned alkaline alkaline-earth metal cyanurate dispersions as a liquid or a gas but is preferably introduced as a gas or in the partially gaseous state. It is usually desirable to disperse the chlorine through the aqueous cyanurate dispersions by mechanical means such as, for example, by continuous high shear mixing or agitation, until the pH falls from the initial pH of 12.0–12.6 depending upon the particular alkaline-earth metal cyanurate salt used, to a pH below 4.0 preferably a pH below 3.5 and chlorine may be added until such slurries have a pH of 1.0 or lower without affecting the yield of chlorocyanuric acid obtained. If insufficient chlorine is used, that is, the dispersions are not chlorinated to a pH of below 4.0 the reaction mixture will contain appreciable quantities of unreacted alkaline-earth metal cyanurate and the maximum yield of chlorocyanuric acid will not be obtained. Also, if the chlorine is not adequately or efficiently dispersed, excessive amounts of chlorine will be required to obtain a reaction mixture having the afore-defined pH. The rate at which the chlorine is introduced into the dispersion is usually not critical and such rate is generally dependent upon the efficiency of the mechanical agitation.

During the chlorination of the aqueous dispersions containing from 10% to 30% by weight of alkaline-earth metal cyanurates in the form of dispersed solids, the chlorocyanuric acids are generally formed as solids as part of the dispersed phase in the aqueous reaction mixture. The solids in the reaction mixture formed during chlorination at a pH between about 3.5 and 4.5 will thus comprise a mixture of a chlorocyanuric acid and an alkaline-earth metal cyanurate.

During the admixture of the chlorine and alkaline-earth metal cyanurate dispersions an exothermic reaction takes place and the temperature of the resulting reaction mixture or slurry will rise from room temperature (e.g., 20° C. to 30° C.) to 60° C. or even as high as 90° C., unless the reaction mixture is cooled. It has generally been found desirable to maaintain the reaction mixture at a temperature of from 0° C. to about 50° C., preferably about 10° C. to 35° C. by cooling the reaction mixture during the addition of the chlorine to the aqueous alkaline earth metal cyanurate slurries. The aqueous reaction mixture may be cooled to a temperature below 0° C., but there is no advantage and there is a danger of the mixture freezing at temperatures below −5° C. Although temperatures of from 25° C. to 50° C. can be employed there is some loss of yield due to the solubility of the chlorocyanuric acids at these temperatures unless the reaction mixture is cooled to from 10° C. to 35° C. prior to the separation of the chlorocyanuric acid therefrom. Since chlorocyanuric acids are appreciably unstable in the presence of water at temperature above 50° C., such temperatures should be avoided to insure against yield losses. In most instances when the reaction mixture or slurries are maintained at a temperature within the preferred range of 10° C. to 35° C. optimum yields, e.g., yields up to 90% of theoretical, based on the alkaline earth metal cyanurate charged, are obtained.

Under the desired conditions of temperatures and pH the reaction is usually completed within from 15 to 40 minutes, depending upon the amount of alkaline-earth metal cyanurate dispersion to be chlorinated, the rate at which the chlorine is introduced into the dispersion, and the efficiency of the agitation of such dispersion.

During and after the introduction of chlorine into the alkaline-earth metal cyanurate dispersion there is formed an aqueous reaction mixture, having a pH below 4.0 preferably below 3.5, and comprising a slurry of chlorocyanuric acid and an aqueous solution of an alkaline-earth metal chloride. The chlorocyanuric acids are substantially insoluble in such solution, the solubility being less than 1.0% by weight at 10° C. The chlorocyanuric acid formed in the aqueous reaction mixture may be separated from the bulk of the aqueous reaction mixture with which it is associated by well-known methods such as filtration, decantation, centrifugation and the like.

Little or no nitrogen trichloride is formed as a by-product during the reaction of chlorine and the alkaline-earth metal salts of cyanuric acid even when the pH is permitted to rise to above 7, although nitrogen trichloride is formed as a by-product when alkali metal salts of cyanuric acid such as sodium or potassium salts are chlorinated as above described. The reason or reasons for the lack of formation of nitrogen trichloride in the processes of the instant invention are not known with certainty but it is believed that the reaction of chlorine with the alkaline-earth metal cyanurates which are in the form of dispersed solids in the reaction mixture may, in part, prevent nitrogen trichloride formation.

Trichlorocyanuric acid may be continuously prepared in accordance with one embodiment of this invention by continuously introducing chlorine, preferably gaseous chlorine, and an aqueous dispersion or slurry of a trialkaline earth metal di-isocyanurate having a pH of from 12.0 to 12.5 into a reaction zone maintained at a temperature within the range of from 0° C.–50° C. The chlorine is usually continuously and simultaneously introduced with the cyanurate dispersion into the reaction zone and is continuously dispersed into the cyanurate dispersion in the reaction zone, with agitation, until, and at a rate such that the dispersion has a pH below 4.0 more desirably a pH below 3.5. If chlorine is introduced into the dispersion at a rate such as to provide a pH above 4.0 under the conditions of continuous chlorination of the tri-alkaline earth metal di-cyanurate, at most only small amounts of trichlorocyanuric acid will be formed. The amount of chlorine introduced is desirably an amount at least equal to, or more than, 100% more than the stoichiometric amount of chlorine necessary to replace the alka- line-earth metal atoms of the di-cyanurate with chlorine atoms and is preferably an amount of chlorine varying from slightly in excess of 100% of the necessary quantity up to 200% of such amount. There is thus continuously formed an aqueous reaction mixture having a pH in the aforedefined range, comprising a slurry of trichlorocyanuric acid in an aqueous solution of an alkaline-earth metal chloride, a portion of which aqueous reaction mixture is usually continuously removed, preferably so as to maintain the volume of aqueous reaction mixture in the reaction zone substantially constant, and from which the trichlorocyanuric acid may be readily separated as above described.

Dichlorocyanuric acid may be continuously prepared in accordance with another embodiment of this invention by continuously introducing chlorine and an aqueous dispersion or slurry of a mono-alkaline-earth metal mono-cyanurate into a reaction zone maintained at a temperature within the range of just above the freezing point of said slurry to about 50° C., preferably a temperature within the range of from 0° C.–50° C. The chlorine is preferably continuously introduced and dispersed into the cyanurate slurry in the reaction zone, with agitation until and at a rate such that the slurry has a pH below 4.0, preferably a pH below 3.0, more preferably a pH in the range of from 2.0 to 2.5. If chlorine is introduced into the dispersion at a rate such as to provide a pH from above 4.0 to about 4.5 under the conditions of continuous chlorination of the mono-alkaline earth metal mono-cyanurate the aqueous reaction mixture will usually contain a mixture of unreacted mono-alkaline-earth metal mono-cyanurate and small amounts of dichlorocyanuric acid. Above a pH of 4.5, no appreciable amounts of dichlorocyanuric acid are formed. The amount of chlorine is at least equal to 100% of the stoichiometric amount of chlorine necessary to replace the alkaline earth metal atoms of the mono-cyanurate with chlorine atoms and is preferably an amount of chlorine varying from slightly in excess of 100% of the necessary quantity to 120% of such amount. There is thus continually formed, an aqueous reaction mixture having a pH in the range of 2 to 4, comprising a slurry of dichlorocyanuric acid in an aqueous solution of an alkaline-earth metal chloride, a portion of which aqueous reaction mixture is continuously removed, preferably so as to maintain the volume of the aqueous reaction mixture in the reaction zone substantially constant, and from which the dichlorocyanuric acid may be readily separated as hereinbefore described.

In the above-described preparation of the chlorocyanuric acids by chlorinating alkaline-earth metal cyanurate dispersions it has been found particularly desirable to continuously separate the chlorocyanuric acids from the bulk of the aqueous reaction mixture by centrifugation until the resultant centrifuge cake contains less than 40% preferably less than 25% by weight of water. The wet product may then be washed with water to remove residual alkaline-earth metal chlorides and the chlorocyanuric acid may then be dried at from 50° C. to 110° C. to form a dry solid product without danger of decomposition or hydrolysis of the chlorocyanuric acids.

As stated heretofore, when the reaction of chlorine and the alkaline-earth metal cyanurates is carried out at temperatures of about 40° C. to 50° C. appreciable amounts of chlorocyanuric acids remain in the solution after the undissolved chlorocyanuric acids are removed from the reaction mixture. In order to obtain maximum yields it is desirable to cool the resulting solution below 35° C., preferably between about 10° C. and 20° C., while dispersing chlorine into such solutions until the pH falls below 2.5 after which additional chlorocyanuric acids are formed as solid particles which can be removed as above described.

A further understanding of the advantages and processes of the present invention will be obtained from the following examples which are intended to illustrate the invention but not to limit the scope thereof, parts and percentages being by weight unless otherwise specified.

Example I

Fifty-six parts of calcium hydroxide were dispersed in 131.7 parts of water and the resulting product mixed at room temperature (25° C.) with a dispersion consisting of 65.4 parts of cyanuric acid and 261.6 parts of water to form an aqueous dispersion containing 154 parts of tri-calcium di-cyanurate. This dispersion which had a pH of 12.5 was introduced into a reactor equipped with an agitator, a thermometer, an off-gas tube, pH electrodes and a chlorine inlet tube and chlorinated with gaseous chlorine for about 40 minutes at a temperature which varied within the range of between 30° C. and 50° C. and until the pH of the slurry was 4.0. The chlorine was introduced into the dispersion at a rate such that the temperature did not exceed 50° C. In this batch 116 parts of chlorine were used corresponding to 120% more than the amount of chlorine theoretically required.

The products of this reaction consisted of an aqueous reaction mixture which consisted of trichlorocyanuric acid in the form of a slurry and an aqueous solution of calcium chloride having a pH of 4.0. This slurry was cooled to room temperature (25° C.) and the aqueous solution of calcium chloride was separated from the trichlorocyanuric acid by filtration and the resultant filter cake, containing trichlorocyanuric acid and residual calcium chloride was washed with cold (5° C.) water. After drying, the product was analyzed and found to contain 85% of available chlorine. A total yield of 100 parts of trichlorocyanuric acid was obtained, representing a yield of 86% based on the tri-calcium di-cyanurate charged.

When a solution of tri-sodium cyanurate containing an equivalent amount of cyanurate radical was chlorinated in place of the calcium di-isocyanurate, under the above conditions, noxious NCl₃ vapors were produced and a product which consisted of 65 grams of a material containing 66% of available chlorine was obtained.

Example II

Forty and seven-tenths parts of magnesium hydroxide were slurried in 95.3 parts of water and the resultant product mixed at room temperature with a slurry containing 70.9 parts of cyanuric acid and 283.2 grams of water to form an aqueous dispersion containing 95 parts of mono-magnesium mono-cyanurate, having a pH of 12.1. This dispersion was introduced into a reactor equipped with a cooling coil, an agitator, a thermometer, an off gas tube, pH electrodes and a chlorine inlet tube. The slurry was cooled, by means of a cooling coil surrounding the reactor, to a temperature within the range of between 10° C. and 15° C. and chlorinated with chlorine gas until the slurry had a pH of 2.5. The chlorine was introduced at a rate such that the temperature of the slurry did not exceed 15° C. during the chlorination. In this batch run 44.8 parts of chlorine were consumed corresponding to 30% more chlorine than the amount theoretically required.

The product of this reaction consisted of an aqueous reaction mixture which consisted of dichlorocyanuric acid in the form of an aqueous slurry and an aqueous solution of magnesium chloride having a pH of 2.5. The aqueous solution of magnesium chloride was separated from the dichlorocyanuric acid by filtration and residual magnesium chloride was removed from the resultant filter cake by washing it with cold (10° C.) water. After drying, the product was analyzed and found to contain 70% of available chlorine. A total yield of 99 parts of dichlorocyanuric acid was obtained representing a yield of about 90% based on the mono-magnesium mono-cyanurate charged.

Example III

An aqueous dispersion of tri-calcium di-cyanurate was prepared by mixing together cyanuric acid, water and calcium hydroxide in proportions of about 131, 800, and 110 parts by weight, respectively. The dispersion which had a pH of 12.6 was agitated at room temperature (25° C.) in a container provided with a mechanical agitator, and introduced over a period of approximately 8 hours and at a rate of about 0.4 part of tri-calcium di-cyanurate per hours, into a reactor equipped with an efficient agitator, pH electrodes and an ice bath for maintaining the reaction temperature between 20° C. and 25° C. Simultaneously with the introduction of the tri-calcium di-cyanurate dispersion, chlorine was charged continuously and was continuously mechanically dispersed through the cyanurate dispersion at a rate such that the pH of the dispersion was 3.5. Throughout the ensuing reaction, the chlorine was introduced at a rate such that the temperature of the dispersion did not exceed 25° C. The products of the reaction included trichlorocyanuric acid in the form of a slurry and an aqueous solution of calcium chloride having a pH of 3.5. These products were removed periodically from the reactor by means of a suction pump to a suitable receiver so that the sojourn time of the reaction mixture in the reactor was about thirty minutes. The trichlorocyanuric acid was separated from the aqueous solution of calcium chloride by filtration and the resultant filter cake was washed with ice water to remove residual calcium chloride therefrom.

The purified trichlorocyanuric acid was air dried over night, heated for 2 hours in a oven at 105° C. then ground to a finely divided state and reheated at 105° C. for 2½ hours. The trichlorocyanuric acid so produced had an available chlorine content of 86.5% and was obtained in yield amounting to 89.5% of theory.

By way of contrast when a solution of trisodium-cyanurate having a pH of 13.5 and containing an equivalent amount of cyanurate radical was batch chlorinated, that is, chlorine was passed into the entire solution of cyanurate so that the pH dropped gradually, a solid product was obtained which contained 75% available chlorine in a yield amounting to 74% of theory based on the reagents charged. Moreover, large quantities of nitrogen trichloride were formed and the process had to be shut down after 10 minutes because of the explosion hazard.

Example IV

An aqueous dispersion of tri-calcium di-cyanurate was prepared by adding, with agitation, 188 parts (lbs.) of an aqueous slurry containing 30% calcium hydroxide, to 327 parts of an aqueous slurry containing 20% cyanuric acid. The amount of calcium hydroxide employed was about 0.1 mol in excess of that required to form tri-calcium di-cyanurate and the pH was about 12.5. The dispersion was continuously agitated and cooled to a temperature of 10° C. Approximately 4.5 parts of this slurry was charged to a chlorination vessel which comprised a jacketed cylindrical glass container having an internal diameter of 5 inches and an internal height of 13 inches, which container was provided with three (3) equidistantly spaced vertical baffles of 1 inch width spaced radially inwards 1 inch from the inside wall of the container. The capacity of the container was about 8 parts (lbs.) of slurry. Agitation was provided by a shaft mounted co-incident with the vertical axis of the container and provided with a six-bladed turbine propeller of 2-inch diameter spaced 2 inches above the inside of the bottom of the container and a second six-bladed turbine propeller of 2-inch diameter spaced 5 inches above the first mentioned propeller. The shaft and propellers were rotated at 2300 revolutions per minute or a propeller tip speed of 1200 feet per minute. The container was also provided with a tube for introducing gaseous chlorine into the bottom of the container beneath the lowest propeller and was also provided with a tube for introducing the aqueous slurry of tri-calcium di-cyanurate into the bottom of the container beneath the lowest propeller. The container was also provided with a tube extending vertically downward into the container at a distance of 10 inches from the bottom of the container for the removal of the reaction products.

Gaseous chlorine was continuously introduced into the 4.5 parts of the tri-calcium di-cyanurate dispersion over a fifteen minute period at such a rate that the temperature of the aqueous medium was maintained at a temperature of 21° C. to 23° C. when brine at a temperature of −25° C. was circulated through the jacket of the container. During this period the chlorine was continuously dispersed through the solution by the agitator propellers and baffles. At the end of this period of time an aqueous heel comprising a slurry of trichlorocyanuric acid and tricalcium dicyanurate in an aqueous solution of calcium chloride and chlorine had formed, the heel having a pH of 2.9 to 3.0.

The remainder of the tri-calcium di-cyanurate dispersion as prepared in the first paragraph of this example, was agitated at room temperature. This dispersion was then continuously introduced into the aqueous heel in the reactor at a rate of 0.4 parts (lbs.) per minute with agitation at the speed described above, and concurrently gaseous chlorine was continuously introduced into the aqueous heel in an amount of 105% in excess of the chlorine theoretically required to react with the tri-calcium di-cyanurate in the container. The continuous agitation of the dispersion continuously dispersed the gaseous chlorine through the aqueous heel and the chlorine was introduced at a rate such that the pH was between 2.9 and 3.0. The temperature of the aqueous heel in the container was maintained at 21° C.–23° C. by circulating coolant through the jacket of the container. When the contents of the container rose above the level of the above-mentioned liquid removal tube, the level of the aqueous heel in the container was maintained constant by continuously pumping a portion of the aqueous heel from the vessel containing trichlorocyanuric acid through the removal tube. The portion of aqueous heel thus removed was continuously supplied to a centrifuge where the trichlorocyanuric acid was removed in the form of a centrifuge cake, while the bulk of the aqueous liquid containing calcium chloride was discarded. The centrifuge cake consisted of trichlorocyanuric acid and about 0.8% of calcium chloride and about 15% water based on the dry weight of the trichlorocyanuric acid. When the centrifuge cake had built up to the capacity of the centrifuge, the supply of aqueous heel to the centrifuge was diverted to a second centrifuge and the centrifuge cake was further centrifuged until it contained 5% to 6% of moisture. The centrifuge cake was then removed from the centrifuge, washed with ice water to remove a major portion of the calcium chloride therein and dried in an oven at 105° C. The yield of trichlorocyanuric acid was 97% based on the tri-calcium di-cyanurate employed and this product contained 85.6% of available chlorine.

The sojourn time of the chlorine and aqueous dispersion of tri-calcium di-cyanurate in the reactor varied between 20 and 25 minutes.

The above-described continuous process was carried out for two periods of 5 and 7 hours respectively, without any difficulties in operation or without decreased yields of trichlorocyanuric acid but it is to be understood that the process is operable continuously over longer periods of time.

*Example V*

An aqueous dispersion of mono-calcium mono-cyanurate was prepared by adding, with agitation, 136 parts of an aqueous slurry containing 30% of calcium hydroxide to 355 parts of an aqueous slurry containing 20% of cyanuric acid, the final dispersion having a 1:1 molar ratio of $Ca(OH)_2$ to cyanuric acid and a pH of 12.1. Four parts of this dispersion were charged to a jacketed chlorination vessel identical with that described in Example IV. This dispersion was agitated and maintained at a temperature of 10° C. by circulating brine at a temperature of −25° C. through the jacket of the vessel.

The dispersion in the vessel was then chlorinated by passing gaseous chlorine through a tube in the bottom of the vessel into the slurry at a point just below the agitator propeller with the propeller operating at 2300 revolutions per minute or a propeller tip speed of 1200 feet per minute, the chlorine being supplied at a rate sufficient to maintain the temperature of the slurry at 15° C. with brine at −25° C. circulating through the cooling jacket. The introduction of chlorine and the mechanical dispersion thereof through the dispersion was continued until the pH of the dispersion was between 2.5 and 3.0. The resulting product was an aqueous reaction mixture comprising dichlorocyanuric acid in an aqueous medium containing a solution of calcium chloride and chlorine.

The remainder of the mono-calcium mono-cyanurate dispersion was cooled to 10° C. and metered into the above-described slurry of dichlorocyanuric acid in the chlorinating vessel through a tube opening into the lower part of the vessel below the lowest propeller at the rate of 0.3 part per minute with continuous agitation at the propeller speed described above; and gaseous chlorine was continuously introduced into the slurry at the rate of 0.03 part per minute corresponding to a 107% molar excess of chlorine theoretically required to replace the calcium atoms and to form dichlorocyanuric acid based on the mono-calcium mono-cyanurate slurry thus introduced. Under the conditions of agitation and dispersion of the chlorine through the slurry, the rate at which the chlorine was introduced was such that the pH of the slurry was between 2.0 and 2.5. The temperature of the slurry was maintained at substantially 17° C. by passing cooling brine at −20° C. through the jacket of the vessel. A portion of the slurry in the vessel was continuously pumped from the vessel through the withdrawal tube at a rate of about 0.35 part per minute thus maintaining a substantially constant volume of heel slurry in the vessel consisting of weight of slurry of about 8 parts.

The slurry removed from the vessel was continuously dewatered in a centrifuge to a water content of less than 40% by weight, based on the dry centrifuge cake. When the cake had built up to the capacity of the centrifuge the slurry removed from the chlorination vessel was diverted to another centrifuge and the cake in the first centrifuge was dewatered until it contained about 25% by weight of moisture. The cake which consisted essentially of dichlorocyanuric acid and water was washed with cold (10° C.) water to remove residual calcium chloride and then dried in an oven for 2.5 hours at 100° C. The yield of dichlorocyanuric acid was above 96%, based on the mono-calcium mono-cyanurate used, and the product contained 70.9% of available chlorine.

The sojourn time of the chlorine and mono-calcium mono-cyanurate in the chlorination vessel varied between 15 and 20 minutes. The continuous process was carried out for 2½ hours without any difficulties in operation or without decreased yields of dichlorocyanuric acid but it is to be understood that the process is operable continuously over much larger periods of time.

In the continuous chlorination of the afore-described alkaline-earth metal salts of cyanuric acid no appreciable amounts of chlorocyanuric acids are formed unless sufficient chlorine is provided and dispersed through the aqueous slurries of the cyanurates to provide a pH of 4.0 or lower and maximum yields are obtained when the pH during the continuous chlorination is below 3.5.

While trichlorocyanuric acid may be produced by chlorinating an aqueous dispersion of a tri-alkaline-earth metal di-cyanurate to below a pH of 4.0, maximum yields are obtained when the dispersion is chlorinated to a pH below 3.0 and no noticeable benefits are obtained by chlorinating such a slurry at a pH below 2.5. On the other hand dichlorocyanuric acid may be produced by chlorinating an aqueous dispersion of a mono-alkaline-earth metal mono-isocyanurate to a pH of 3.5 but maximum yields are obtained when such slurry is chlorinated to a pH below 2.5 and no noticeable benefits are obtained by chlorinating such a slurry to a pH below 2.0.

In the chlorination of the alkaline-earth metal salts of cyanuric acid as hereindescribed it is possible to introduce chlorine into such slurries at a higher pH without decomposition of the triazine ring and the concomitant formation of nitrogen trichloride that has been heretofore possible by the chlorination of alkali metal cyanurates. Also such chlorination does not require a rigid pH control and is generally less hazardous and more economical than the prior art chlorination procedures.

Th products of the processes of the present invention are useful as the active constituents of compositions having oxidizing, bleaching, detergent and disinfecting properties.

What is claimed is:

1. A process for preparing a chlorocyanuric acid which comprises introducing chlorine into an aqueous alkaline dispersion of an alkaline-earth metal salt of cyanuric acid at a temperature in the range of from just above the freezing point of said dispersion to about 50° C. until the pH of the dispersion is below 4.0.

2. A process for preparing trichlorocyanuric acid which comprises introducing chlorine into an aqueous alkaline dispersion of a tri-alkaline-earth metal dicyanurate at a temperature of from about 0° C. to 50° C. until the pH of the dispersion is below 4.0.

3. A process for preparing trichlorocyanuric acid which comprises introducing gaseous chlorine into an aqueous alkaline dispersion of tri-calcium di-cyanurate maintained at a temperature of from just above the freezing point of said dispersion of about 50° C. until the pH of said dispersion is below 4.0, thereby forming an aqueous reaction mixture in said reaction zone, having the aforedefined pH and comprising an aqueous slurry of trichlorocyanuric acid, and thereafter separating the trichlorocyanuric acid from the bulk of the aqueous phase of said slurry.

4. A process for preparing trichlorocyanuric acid which comprises introducing, with agitation, an aqueous alkaline dispersion containing from 20% to 30% by weight of tri-calcium di-cyanurate into a reaction zone maintained at a temperature in the range of from about 10° C. to about 35° C., introducing gaseous chlorine into said dispersion in said reaction zone until the pH of said dispersion is below 3.5 thereby forming in said reaction zone an aqueous reaction mixture having the aforedefined pH and comprising an aqueous slurry of trichlorocyanuric acid and thereafter removing the trichlorocyanuric acid from the bulk of the aqueous phase of said slurry.

5. A continuous process for preparing trichlorocyanuric acid which comprises continuously introducing an aqueous alkaline dispersion of a tri-alkaline-earth metal dicyanurate into a reaction zone which is maintained at a temperature in the range of from 0° C. to 50° C., continuously introducing and dispersing gaseous chlorine into said dispersion at a rate sufficient to continuously form an aqueous reaction mixture in said zone having a pH below 3.5 and comprising an aqueous slurry of trichlorocyanuric acid, continuously removing trichlorocyanuric acid together with a portion of the aqueous phase of said slurry from the reaction zone and thereafter separating the trichlorocyanuric acid thus removed from the aqueous phase associated therewith.

6. A continuous process for preparing trichlorocyanuric acid which comprises continuously introducing an aqueous alkaline dispersion of tri-calcium di-cyanurate into an aqueous slurry of tri-chlorocyanuric acid in a reaction zone, said slurry being maintained at a temperature of from 0° C. to 50° C., continuously introducing and dispersing gaseous chlorine into said dispersion in said reaction zone at a rate sufficient to continuously form an aqueous reaction mixture in said reaction zone having a pH below 3.5 and comprising an aqueous slurry containing additional quantities of trichlorocyanuric acid, continuously removing trichlorocyanuric acid, together with a portion of the aqueous phase of said slurry from the reaction zone and thereafter separating the trichlorocyanuric acid thus removed from the bulk of the aqueous phase associated therewith.

7. A process for preparing dichlorocyanuric acid which comprises introducing chlorine into an aqueous alkaline dispersion of a mono-alkaline-earth metal mono-cyanurate at a temperature of from about 0° C. to 50° C. until the pH of the dispersion is below 4.0.

8. A process for preparing dichlorocyanuric acid which comprises introducing gaseous chlorine with agitation into an aqueous alkaline dispersion of mono-calcium mono-cyanurate at a temperature of from just above the freezing point of said dispersion to about 50° C., until the pH of said dispersion is below 4.0, thereby forming an aqueous reaction mixture in said reaction zone, having the afore-defined pH and comprising an aqueous slurry of dichlorocyanuric acid and thereafter separating the dichlorocyanuric acid from the bulk of the aqueous phase of said slurry.

9. A process for preparing dichlorocyanuric acid which comprises introducing, with agitation, an aqueous alkaline dispersion containing from 20% to 30% by weight of mono-calcium mono-cyanurate into a reaction zone maintained at a temperature in the range of from about 10° C. to about 35° C., introducing gaseous chlorine into said zone until the pH of said dispersion is below 3.0 thereby forming in said zone, an aqueous reaction mixture having the aforedefined pH and comprising an aqueous slurry of dichlorocyanuric acid and thereafter removing the dichlorocyanuric acid from the bulk of the aqueous phase of said slurry.

10. A continuous process for preparing dichlorocyanuric acid which comprises continuously introducing an aqueous alkaline dispersion of a mono-alkaline-earth metal mono-cyanurate into a reaction zone which is maintained at a temperature in the range of from 0° C. to 50° C., continuously introducing and dispersing gaseous chlorine into said dispersion in said reaction zone at a rate sufficient to continuously form an aqueous reaction mixture in said reaction zone having a pH below 3.0 and comprising an aqueous slurry of dichlorocyanuric acid, continuously removing dichlorocyanuric acid, together with a portion of the aqueous phase of said slurry, from the reaction zone and thereafter separating the dichlorocyanuric acid thus removed from the aqueous phase associated therewith.

11. A continuous process for preparing dichlorocyanuric acid which comprises continuously introducing an aqueous alkaline dispersion of mono-calcium mono-cyanurate into an aqueous slurry of dichlorocyanuric acid in a reaction zone, said slurry being maintained at a temperature of from 0° C. to 50° C., continuously introducing and dispersing gaseous chlorine into said dispersion in said slurry in the reaction zone at a rate sufficient to continuously form an aqueous reaction mixture in said reaction zone having a pH below 3.0 and comprising an aqueous slurry containing additional quantities of dichlorocyanuric acid, continuously removing dichlorocyanuric acid together with a portion of the aqueous phase of said slurry from said reaction zone and thereafter separating the dichlorocyanuric acid thus removed from the bulk of the aqueous phase associated therewith.

References Cited in the file of this patent

UNITED STATES PATENTS

| | | |
|---|---|---|
| 2,184,886 | Muskat et al. | Dec. 26, 1939 |
| 2,184,888 | Muskat et al. | Dec. 26, 1939 |
| 2,913,460 | Brown et al. | Nov. 17, 1959 |
| 2,964,525 | Robinson | Dec. 13, 1960 |
| 2,969,360 | Westfall | Jan. 24, 1961 |
| 3,035,054 | Symes et al. | May 15, 1962 |
| 3,035,056 | Symes | May 15, 1962 |
| 3,072,654 | Vazopolos | June 8, 1963 |

FOREIGN PATENTS 219,930 Australia _____ Nov. 15, 1956

OTHER REFERENCES

Hantzsch: Journal of the Chemical Society, vol. 90, pages 146–148 (1906).

Smolin et al.: S-Triazines and Derivatives, Interscience Pub. Inc., N.Y., 1959, pages 284, 308 and 391.